United States Patent

Souviron

Patent Number: 5,612,714
Date of Patent: Mar. 18, 1997

[54] PROCESS AND SYSTEM OF IMAGE PROCESSING

[75] Inventor: Marc Souviron, Saint Sernin sur Rance, France

[73] Assignee: Synelec, S.A., Saint Sernin sur Rance, France

[21] Appl. No.: 836,611

[22] Filed: Feb. 18, 1992

[51] Int. Cl.$^6$ ..................................... G09G 5/00
[52] U.S. Cl. ........................... 345/127; 345/115; 345/137; 345/132; 382/299
[58] Field of Search .......................... 340/717, 728, 340/731; 382/47, 298, 299; 345/1, 3, 132, 136, 127, 128, 129, 130, 156, 168, 115, 137; 358/448

[56] References Cited

U.S. PATENT DOCUMENTS

| | | | |
|---|---|---|---|
| 4,419,661 | 12/1983 | Hetsugi | 340/707 |
| 4,598,384 | 7/1986 | Shaw et al. | 345/116 |
| 4,725,892 | 2/1988 | Suzuki et al. | 382/47 |
| 4,746,981 | 5/1988 | Nadan et al. | 340/731 |
| 4,774,581 | 9/1988 | Shiratsuchi | 382/47 |
| 4,835,532 | 5/1989 | Fant | 340/728 |
| 4,857,992 | 8/1989 | Richards | 358/13 |
| 4,858,026 | 8/1989 | Richards | 358/13 |
| 4,875,173 | 10/1989 | Nakajima | 382/47 |
| 5,048,105 | 9/1991 | Adachi | 382/47 |
| 5,107,254 | 4/1992 | Choi | 382/47 |
| 5,138,672 | 8/1992 | Hirabayashi et al. | 382/47 |

FOREIGN PATENT DOCUMENTS

| | | |
|---|---|---|
| 0272762 | 6/1988 | European Pat. Off. . |
| 0318291 | 5/1989 | European Pat. Off. . |
| 129573 | 8/1983 | Japan ................ 382/47 |
| 174187 | 7/1991 | Japan ................ 340/717 |
| 2056228 | 3/1981 | United Kingdom . |

*Primary Examiner*—Richard Hjerpe
*Assistant Examiner*—Lun-Yi Lao
*Attorney, Agent, or Firm*—Greenblum & Bernstein P.L.C.

[57] ABSTRACT

A method and system of image processing are disclosed in which a source image is enlarged, the source image being represented by a source matrix of image elements having Y0 columns and X0 lines of image elements. The source image is enlarged and displayed on a visualization screen, comprising a matrix of N by M screens. Adjacent data elements within the source matrix are assigned to respective image windows within an M by N matrix having M N image windows, each image window being divided into X1 lines and Y1 columns of image elements. Each image element is sub-sampled to form an intermediate image matrix having X2 Y2 image elements. The resulting intermediate image matrix is then over-sampled to form an output image having X3 Y3 image elements. The resulting X3 Y3 image element output matrix is then registered to a matrix having Y4 columns and X4 lines of image elements, for subsequent display on the visualization screen.

15 Claims, 6 Drawing Sheets

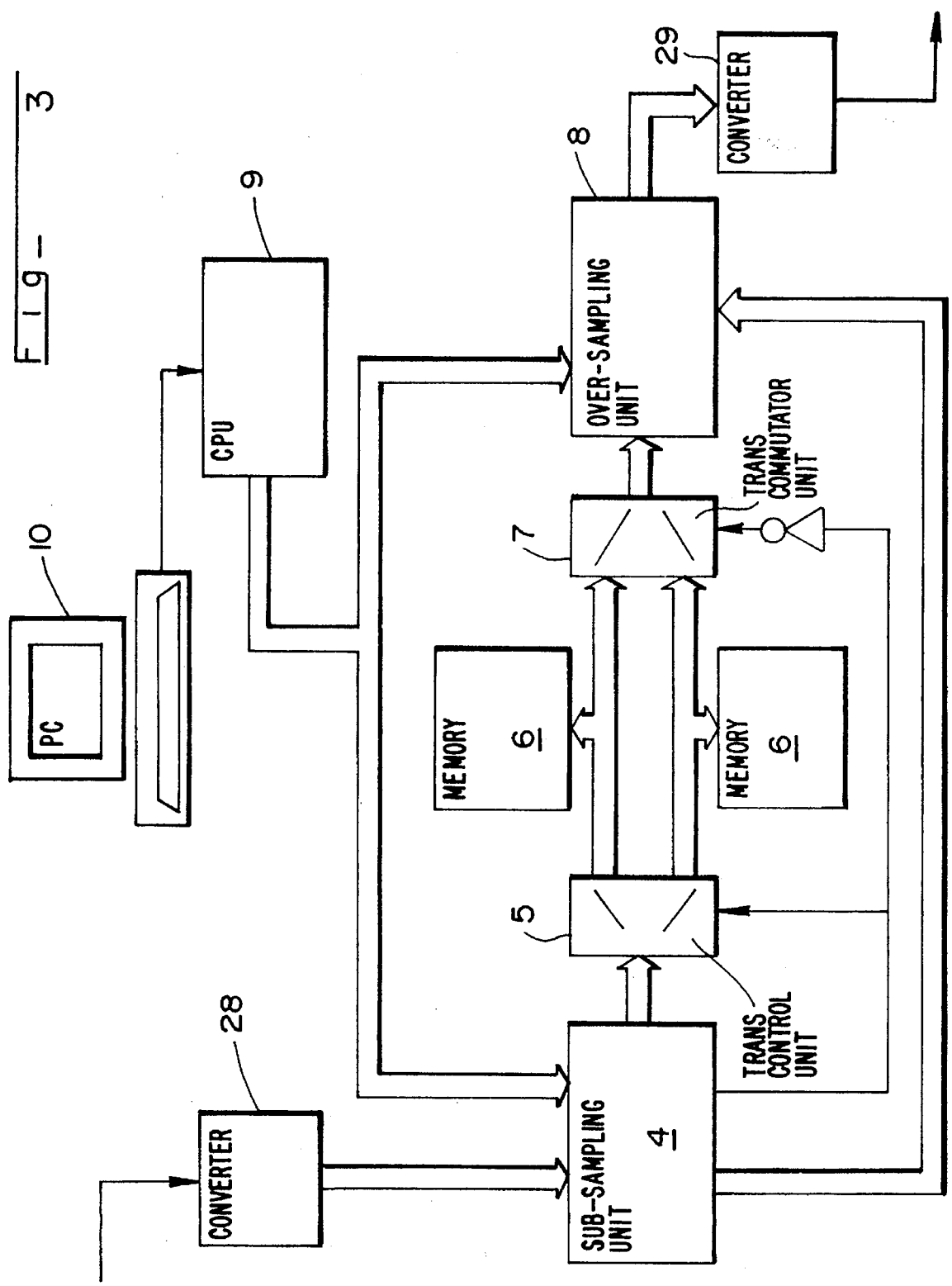

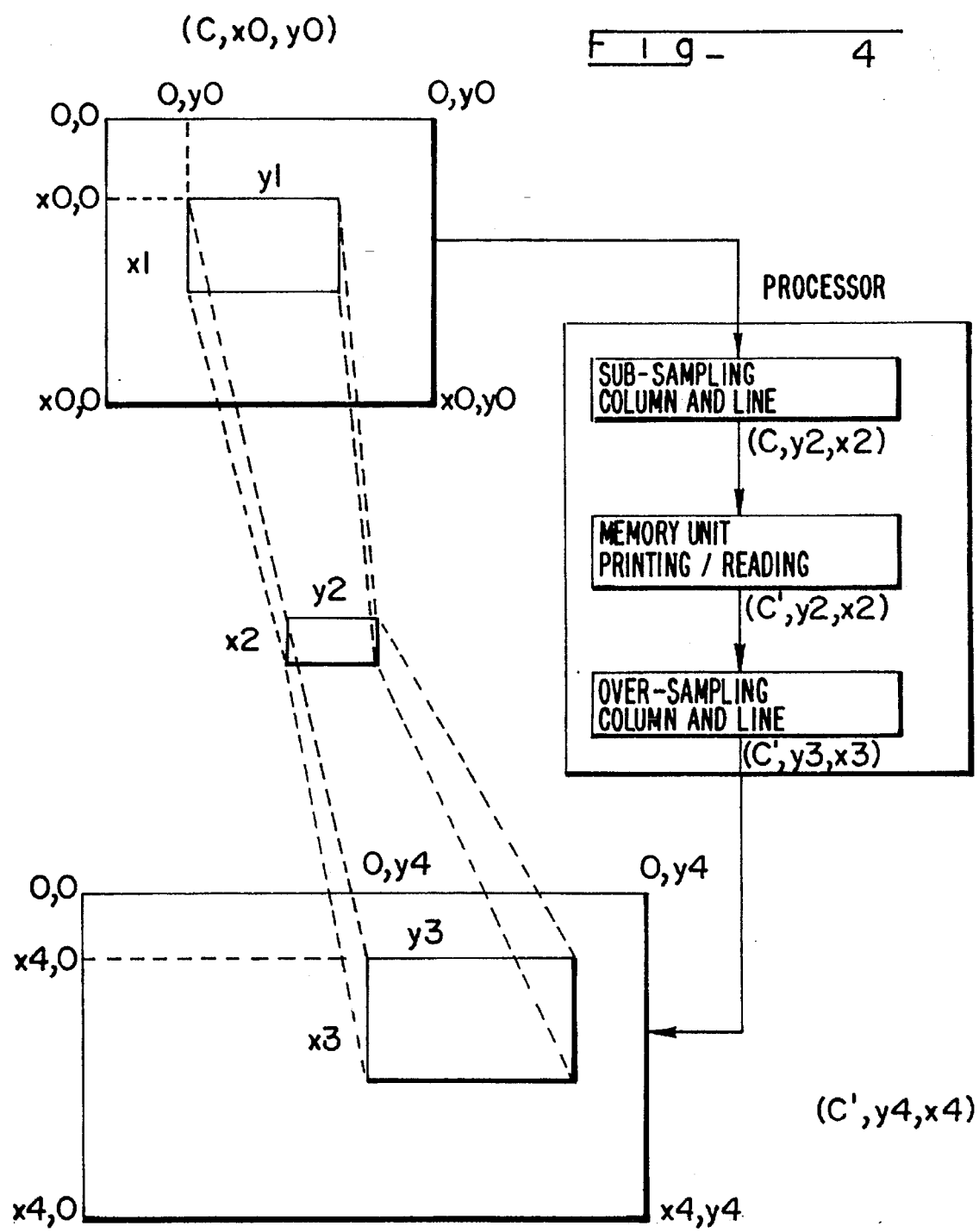

PROCESS AND SYSTEM OF IMAGE PROCESSING

1. FIELD OF THE INVENTION

The present invention is related to a method and a system for image processing.

More specifically, it is related to a method and a system for processing, in real time, source image furnished at a rate C, to produce display images to be visualized on a visualization display unit (wall of images) formed by N columns and M lines of visualization screens.

2. DISCUSSION OF BACKGROUND INFORMATION

Visualization display units are used to visualize large format images of up to several dozen square meters in size. These visualization display units are often placed in very large areas such as, for example, stadiums, airport halls or conference halls, for the benefit of persons who are in these areas.

Currently, display images are visualized on a visualization display unit having N columns and M lines of visualization screens (each screen having Y columns and X lines) from source images formed by a matrix of YO columns and XO lines. A conventional method includes the following steps:

(a) each source image XO YO is divided into MN equal sub-matrix windows. If the ratios XO/M and/or YO/N are not whole numbers, the matrix window corresponding to the last column and/or the last line of the visualization display unit will be smaller than the other matrix windows. In other words, the visualization of the source image will be partial.

(b) The lines and the columns of each matrix window are interpolated by repeating each column N times and each line M times.

(c) Each of the interpolated matrix windows are delivered to the corresponding screen of the visualization display unit.

If M is greater than N, or if N is greater than M, the display image produced will respectively be elongated or broadened with respect to the source image. In order for the display image to completely occupy the visualization surface which has MX lines and NY columns, these lines and columns must respectively be multiples of XO and YO.

There are several limits and disadvantages of the above-described conventional method. Enlargement of the source image, either in width or in height, must be presented as a whole number, because the interpolation coefficients of the lines and the columns ar whole numbers (repetition), and the display images produced are hazy, especially in case of very large enlargements (strobe effect).

There are methods of image processing that can avoid haziness of the produced image by using complicated interpolation functions. These methods are valid only for processing static images or weak resolution images, and cannot be applied on visualization display units having a matrix of screens.

SUMMARY OF THE INVENTION

For these reasons and for others, the present invention proposes a method and a system for processing source images in real time. The system produces display images to be visualized on a visualization display unit comprising N columns and M lines of visualization screens, but avoids the disadvantages mentioned earlier, and overcomes the limitations of the current state of the art.

According to the present invention, any interpolation coefficient of lines or of columns may be used. The screens constituting the visualization display unit may each have a number of lines and a number of columns that are different from those of the source image, without it being necessary to use standard converters. In addition, the display images produced are not hazy, and the display images produced can completely occupy any format of the visualization display unit.

To this end, and according to one arrangement of the present invention, a method is provided for processing, in real time, images provided at a rate C. Each image is formed of a matrix of YO columns and XO lines (XO YO elements). The images are processed in order to produce display images, corresponding to the source images or to a portion of the source images, the display images being visualized on a visualization display unit (wall of images) having N columns and M lines of visualization screens.

The source images (or a desired portion of these source images) are furnished at a rate C and are each divided into matrices having MN image windows. Each matrix generally comprises Y1 columns and X1 lines, thus producing MN image wave windows, each at a rate C. Each matrix window X1 Y1 is processed to produce a visualization matrix of Y4 columns and X4 lines to be visualized on one of the MN visualization screens. The process is characterized in that each image wave window X1 Y1 is processed according to the following steps:

(a) The Y1 columns and the X1 lines of each image window are sub-sampled to produce an intermediate image matrix of Y2 columns and X2 lines (X2 Y2 image elements) in accordance with a column coefficient of sub-sampling $K_C=Y2/Y1$ and a line coefficient of sub-sampling $K_L=X2/X1$. $K_C$ and $K_L$ are each, independently, one of the values 1, ½, ⅓, etc. Each line and each column of the intermediate image respectively replace one or more lines or columns of the image window, and each of the elements of the intermediate image are calculated as the arithmetic mean or the weighted mean of the corresponding image elements of the image window which is being replaced.

(b) The formed intermediate images are stored at the rate C, in printing/reading memories.

(c) The stored intermediate images are read in the same order as they were stored and at a rate C' equal to or different from the rate C.

(d) The columns Y2 and lines X2 of each intermediate image are over-sampled to produce an output image having a matrix of Y3 columns and X3 lines. The over-sampling is performed in accordance with a coefficient of over-sampling of columns $E_C=Y3/Y2$ and with a coefficient of over-sampling of lines $E_L=X3/X2$, where $E_C$ and $E_L$ are each any value greater than or equal to 1. Each element of the output image X3 Y3 is calculated as a weighted mean on the basis of the corresponding neighboring elements of the columns or of the lines of the intermediate image being over-sampled. Each output image of X3 Y3 elements are registered into a matrix of X4 Y4 elements, where Y3 is less or equal to Y4 and X3 is less or equal to X4.

According to another arrangement of the present invention, a processing system is provided. Matrixing means are provided to matrix (divide into matrices) each of the source images XO YO (or the desired portion of these source images) into MN image windows, each composed of Y1 columns and X1 lines. Processing means transform each image window X1 Y1 into an image having Y4 columns and X4 lines to be visualized on one of the MN visualization screens. The processing means include several devices. Processors are provided for re-sampling images with multiple sequences (PRISM) of a number MN.

Each processor (PRISM) comprises:

(a) a sub-sampling unit receiving data, in a digital form, from the image windows X1 Y1 at a rate C, the sub-sampling unit including:

a first sub-unit for sub-sampling of columns (in accordance with a coefficient of sub-sampling of columns $K_C=Y2/Y1$) the first sub-unit receiving the lines from the image window, each line having Y1 elements, and delivering lines each having Y2 elements;

a second sub-unit for sub-sampling of lines (in accordance with a coefficient of sub-sampling of lines $K_L=X2/X1$), the second sub-unit receiving the lines having Y2 elements per line and delivering, at a rate C, intermediate images X2 Y2;

(b) a transmission control unit for receiving the formed intermediate images X2 Y2 and for delivering them one after another to the two printing/reading memories, each memory receiving an image X2 Y2;

(c) two printing/reading memories constructed by a memory segmented into two zones, the first being used for printing and the second being used for reading, the roles of the two zones being interchanged when the printing of each image is terminated;

(d) a transmission commutator unit for reading, at a rate C', different or equal to C, the memories one after another in the same order as the transmission control unit at the over-sampling unit; and (e) an over-sampling unit receiving, at a rate C', intermediate images X2 Y2 one after another, the over-sampling unit comprising:

a third sub-unit for over-sampling of columns in accordance with a coefficient of over-sampling of columns $E_C=X3/X2$, the third sub-unit receiving the lines from the intermediate image, each line having Y2 elements, and delivering lines with Y3 elements; and a fourth sub-unit for over-sampling of lines in accordance with a coefficient of over-sampling of lines $E_L=X3/X2$, the fourth sub-unit receiving the lines from the preceding sub-unit (Y3 elements/line) and delivering output images X3 Y3.

The system further comprises a central processing unit (CPU) for controlling the sub- and over- sampling units and the transmission units of each processor, and further comprises a control unit (PC) linked to the central processing unit, which is used to introduce into the system, among other values, the processing parameters $K_C$, $K_L$, $E_C$ and $E_L$.

BRIEF DESCRIPTION OF THE DRAWINGS

The present invention will be understood upon reading the detailed description that follows, accompanied by drawings in which:

FIG. 3 is a diagram that presents the structure of a processor and its connection with other elements of the system, FIG. 4 is a diagram that presents the variations that occur in each image due to processing by a processor.

DETAILED DESCRIPTION OF EXEMPLARY EMBODIMENTS

Figure 2:
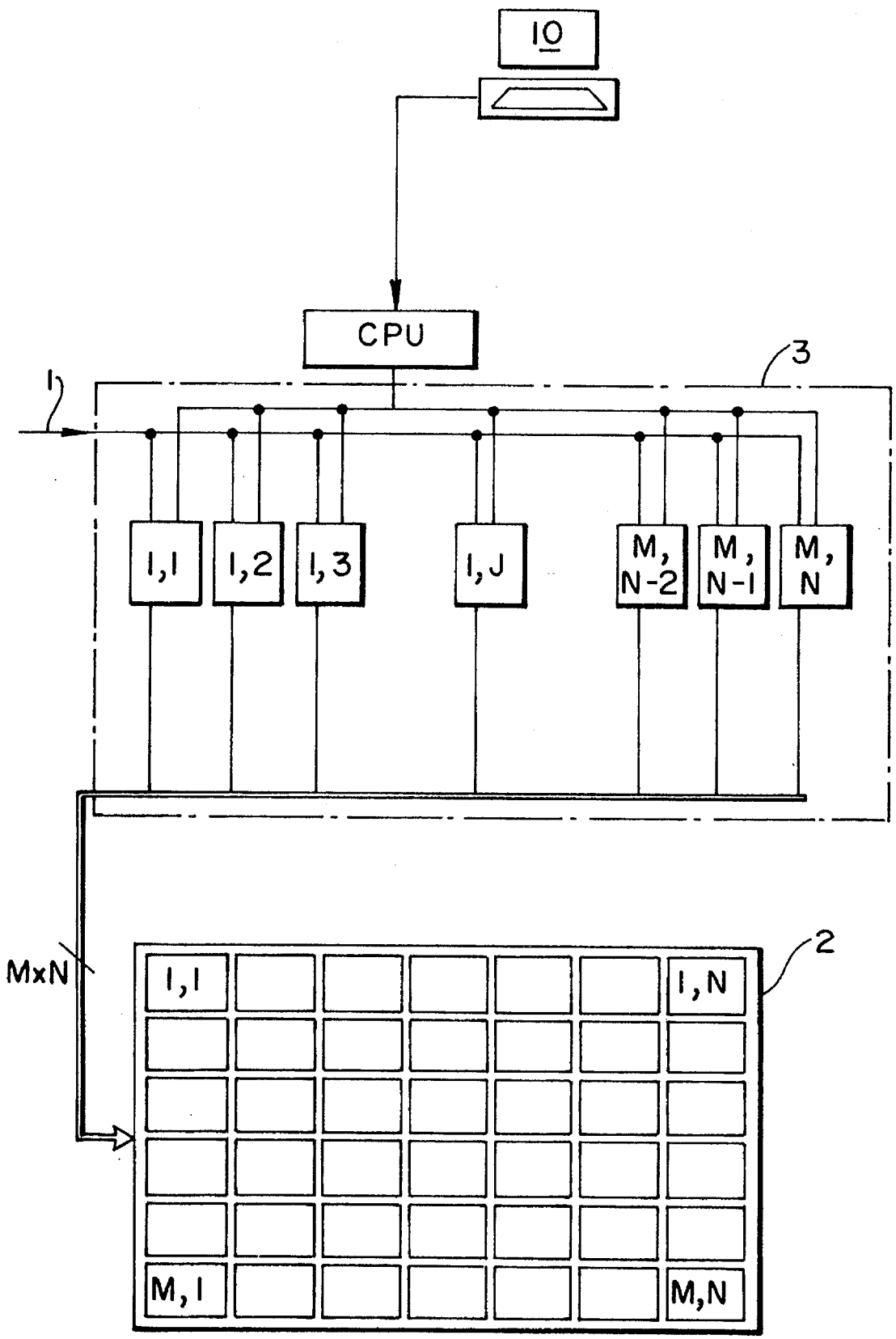
FIG. 2 is a diagram that presents the general structure of the processing system.

FIG. 2 presents the general architecture of the system according to the invention. Referring to FIG. 2, source images are input at an input (1) of a system (3), and they are each divided into MN of matrices (2). Each matrix constitutes a window or a part of a source image, and is, after processing, visualized on one of the MN visualization screens (2) arranged according to N columns and M lines.

The invention differs from prior art by the processing method of each image window that results in an output image to be visualized on one of the screens of a visualization display unit. According to prior art, in the field of large format visualization using several screens, processing consists of repeating each line and each column of the image window a predetermined number of times to have an output image that has the same number of elements as each screen of the display unit. This necessarily means that the enlargement coefficient is a whole number.

As an example, to enlarge a source image 4 times, the lines and the columns of each image window are each repeated once in order to have an output image having twice the number of lines and columns of the image window. In this case, the display image occupies the surface of 4 screens of the same number of elements as the source image. Each element of the source image is represented by 4 elements, having the same value as the display image. The grains of the display image are 4 times coarser than those of the source image.

According to the invention, the restrictions on the enlargement coefficient are eliminated and preservation of the quality of the source image is improved.

According to the method of the present invention, the lines and the columns of each image window first go through a sub-sampling and then an over-sampling, separated by a segmented printing/reading memorization. The use of sub-sampling enables, on the one hand, the use of moderate capacity memories. On the other hand, by cooperating with over-sampling, it enables modulation at will of the characteristics of the output image that forms a part of the display image, especially enlargement, and also the number of elements.

In sub-sampling as in over-sampling the new elements of the intermediate image, or the output image, are a weighted mean of the neighboring elements of the processed image. Sub-sampling of the image window is done serially according to a sub-sampling of columns and then a sub-sampling of lines.

Sub-sampling of the columns of the intermediate image according to which each $K_C$ columns of the image window (Y12 columns and X1 lines) are replaced by a single column to form the intermediate image (Y2 columns and X2 lines). Each element of each column of the intermediate image is either the arithmetic mean of the $K_C$ elements corresponding to the requisite columns of the image window, or the weighted mean of these corresponding elements.

Figure 1:
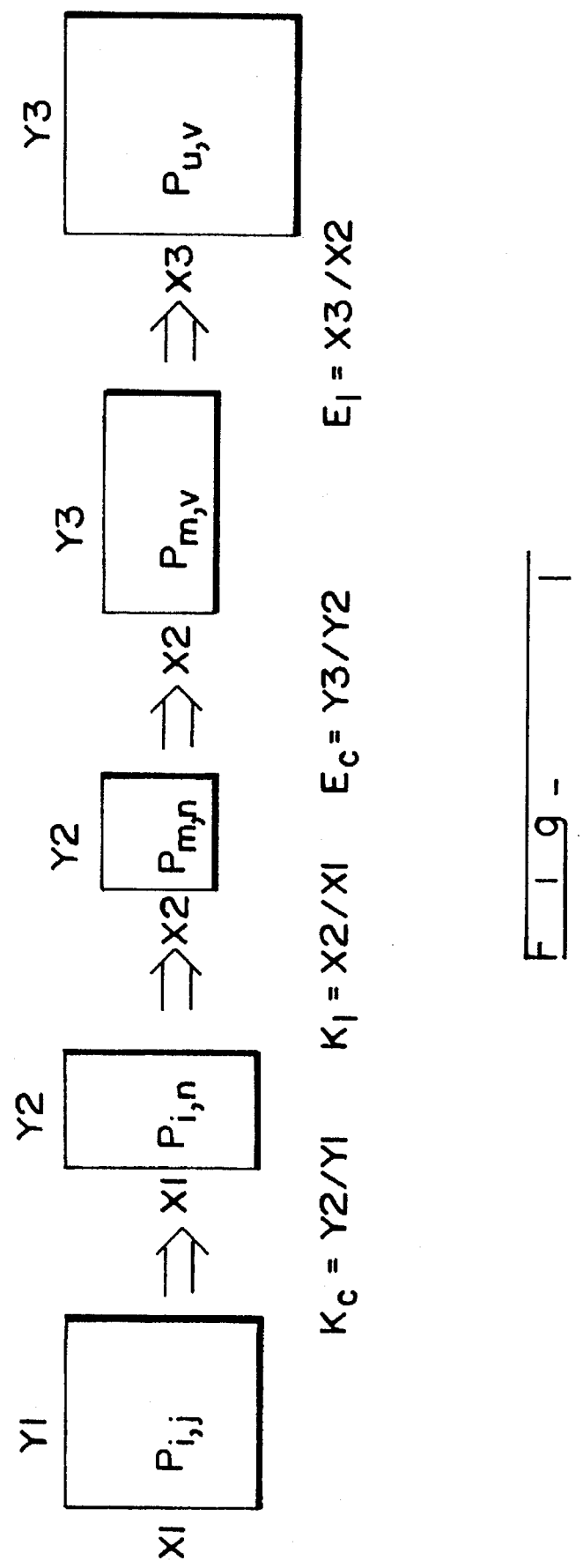
FIG. 1 is a diagram that presents both sub-sampling and over-sampling into columns and into lines.

In FIG. 1, an element $P_{ij}$ of an image window where i=1, 2, ..., X1 and j=1, 2, ..., Y1, and an element $P_{i,n}$ of a produced line, where n=1, 2, ..., Y2, are shown. The element $P_{i,n}$ of column n is calculated according to one of the following two formulae:

$$P_{i,n} = (1/K_C) \sum_{j=n}^{j=n+K_C-1} P_{ij} \quad (1)$$

in which the element $P_{i,j}$ is the arithmetic mean of the elements $$P_{i,j}, \ldots P_{i,j+K_C-1}, \text{ or}$$

$$P_{i,n} = \sum_{j=n}^{j=n+K_C-1} P_{ij} a(j-n) \quad (2)$$

in which the element $P_{i,n}$ is the weighted mean of the elements $$P_{i,j}, \ldots, P_{i,j+K_C-1},$$

$$a = a(0), a(1), \ldots, a(K_C-1)$$

The a coefficients are given.

The choice of these elements is made to give certain effects to the intermediate images produced.

The choice of a(S) as a positive symmetrical function having an approximately sharp single peak leads to the production of intermediate images having an appropriate contrast.

The choice of a(S) as a constant value equal to $1/K_C$ reduces the formula (2) to the formula (1).

Signals representing the three colors of the image arrive in a digital form. Each color is (for example) digitized with 8 bits.

Figure 5A:
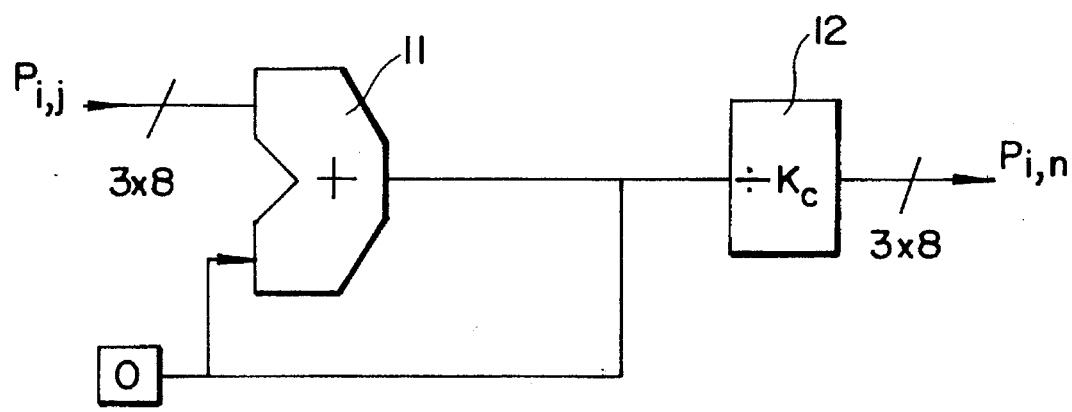
FIGS. 5a and 5b are two diagrams that present the details of processing by sub-sampling of columns.

To obtain sub-sampling, referring to FIG. 5a, a sub-unit, for sub-sampling and for producing the arithmetic mean, comprises an adder for storing elements (11) and a divider (12). The adder receives the lines from the image window, one after another, each line comprising Y1 elements, adds each $K_C$ element and delivers the sum to the divider. The divider divides the sum by $K_C$ thus producing the lines, each having Y2 elements, $K_C=Y2/Y1$.

Figure 5B:
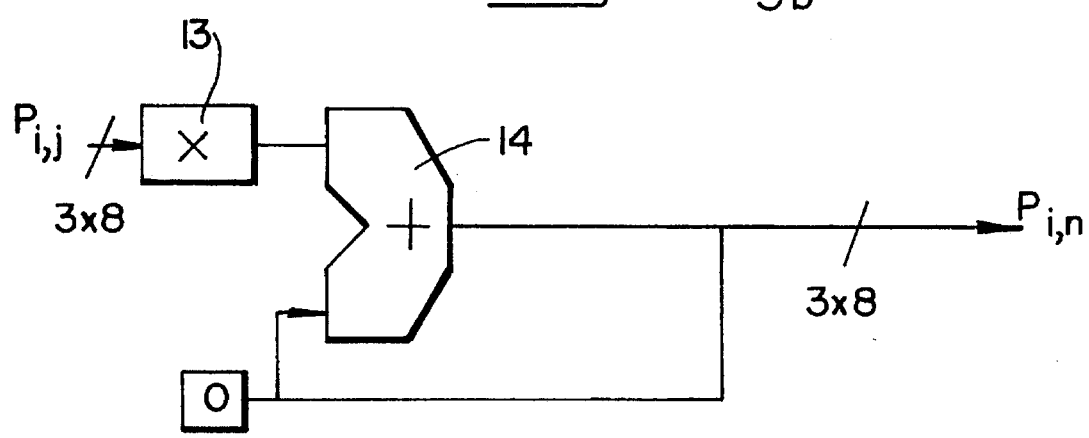

Referring to FIG. 5b, the sub-unit for sub-sampling and for producing the weighted mean comprises a multiplier (13) and an adder for storing elements (14). The multiplier receives the lines from the image window, one after another, each line comprising Y1 elements, and multiplies the elements one after the other by the coefficients: a(0), a(1), ... a ($K_C$-1). The multiplier repeats the operation in a cyclic manner according to the cycle $K_C$ elements. The adder adds the elements of each cycle and delivers the sum, thus producing intermediate lines, each having Y2 elements. $K_C=Y2/Y1$.

The sub-sampling of lines from the image window is done on the data produced by the sub-sampling of columns.

According to this sub-sampling, the liens given by the sub-sampling unit of columns are replaced. Each of $K_L$ lines are replaced by a line forming a part of the intermediate image.

Similarly to the sub-sampling of columns, the sub-sampling of lines is done either according to the principle of arithmetic mean or according to the principle of weighting mean.

Figure 6A:
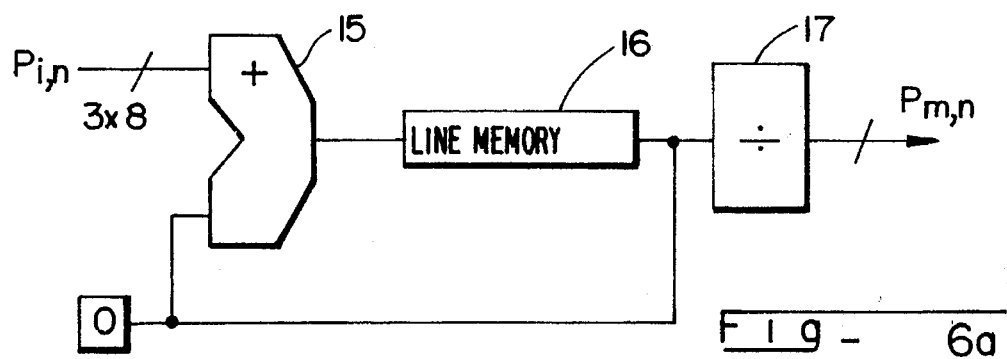
FIGS. 6a and 6b are two diagrams that present the details of the processing by sub-sampling of lines.

Referring to FIG. 6a, the sub-sampling unit for lines, which sub-samples according to the principle of arithmetic mean, comprises an adder for storing lines (15), a line memory (16), and an divider (17). The adder receives the lines output by the unit for sub-sampling of columns, each line having Y2 elements, and adds of each of $K_L$ lines together by storing the intermediate results in the line memory, when they arrive, up until the $K_L$th line.

The divider divides each element of the stored line (accumulation of $K_L$ lines) by $K_L$, thus producing intermediate images each having X2 lines and Y2 columns. $K_L=X2/X1$.

Figure 6B:
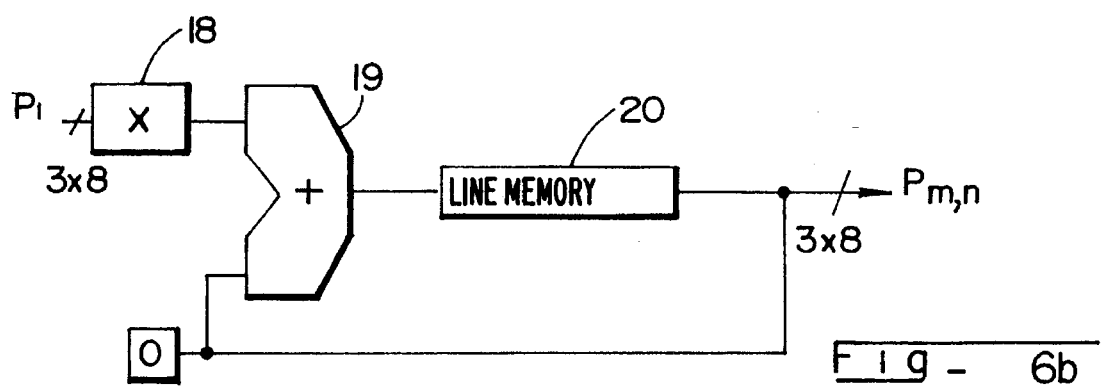

Referring to FIG. 6b, the unit for sub-sampling of lines comprises, according to the principle of weighting mean, a multiplier (18), and adder for storing lines (19) and a line memory (20). The multiplier receives lines output by the unit for sub-sampling of columns, each line having Y2 elements, and cyclically multiplies the elements of each line by coefficients a'(0), a'(1), ..., a' ($K_L$-1) furnished previously. The results of these multiplications, for the lines, are added by the line adder; and intermediate results are accumulated in the line memory up until the $K_L$th line which is the weighted mean of the $K_L$ lines being considered.

The lines produced thus form intermediate images having X2 lines and Y2 columns of image elements.

The intermediate images formed are stored one after the other in a memory that has two segments, each of which can be printed or read.

It must be noted that the coefficient of sub-sampling of columns and of lines $K_C$ and $K_L$ can be 1/n where n is an integer greater than or equal to 1. It is preferable that these coefficients independently adopt one of the values ($\frac{1}{2}^n$), where n=1, 2, ... 8.

The transmission control unit (5) delivers the intermediate images formed (X2 Y2) to the two memories (6) at a rate C, and in a sequential manner. Whereas the multiplier (5) writes/prints at one of the two memories (6), the transmission commutator unit (7) reads the other memory containing the preceding image (X2 Y2) at the over-sampling unit (8).

At the end of printing, the roles of the two memories are inverted.

The over-sampling unit (8) first over-samples the intermediate images read (X2 Y2) according to an over-sampling of columns, and then according to an over-sampling of lines, and this is done with the help of two units for over-sampling columns and lines.

Figure 7:
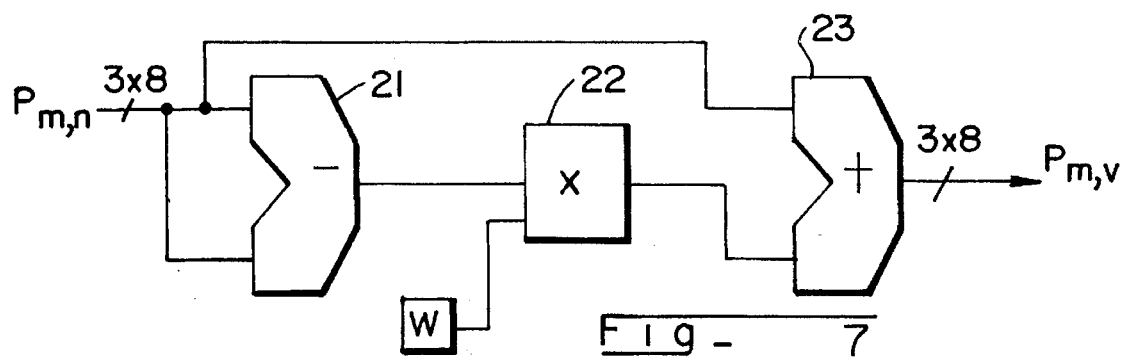
FIG. 7 is a diagram that presents the details of over-sampling of columns.

Referring to FIG. 7, a sub-unit for over-sampling of columns comprises a subtractor (21), a multiplier (22) and an adder (23). To calculate an element $P_{m,v}$, the subtractor reads the elements $P_{m,n}$ and $P_{m,n+1}$ where n is the whole portion of the ratio $v/E_C$ and retains the difference between them. The multiplier multiplies this difference by the coefficient W where W is the decimal portion of the ration $v/E_C$. The adder adds the result of this multiplication to the value of the element $P_{m,n}$, $$P_{m,v} = W(P_{m,n+1} - P_{m,n}) + P_{m,n}$$

where n=E ($v/E_C$) and

W=D($v/E_C$) .

Figure 8:
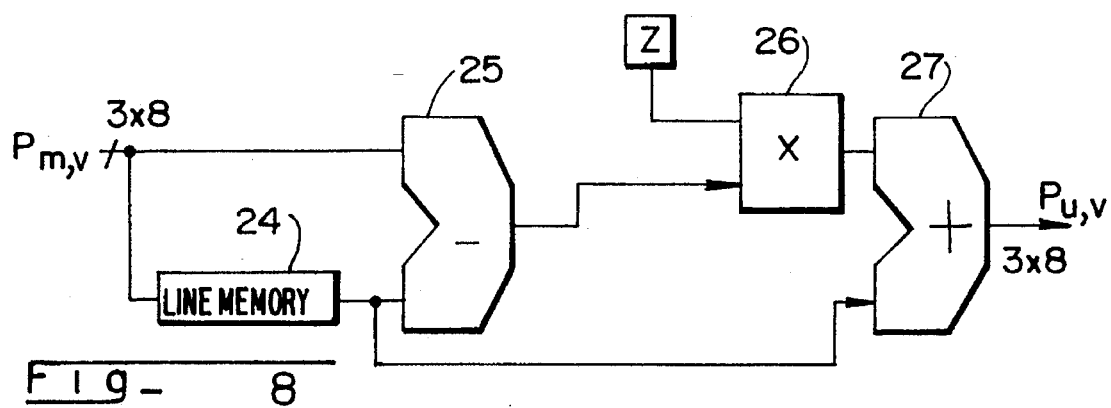
FIG. 8 is a diagram that presents the details of over-sampling of lines.

Referring to FIG. 8, a sub-unit for over-sampling of lines comprises a line memory (24), a subtractor (25), a multiplier (26) and an adder (27). To calculate the point $P_{u,v}$, the line memory (24) stores Y3 elements, including element $P_{m,v}$ where m is the whole portion of the ratio $u/E_L$. The subtractor reads the points $P_{m+1,v}$ and $P_{m,v}$ retains the difference between them. The multiplier multiples this difference by the coefficient Z where Z is the decimal portion of the ratio $u/E_L$. The adder adds the result of this multiplication to the value of the element.

$$P_{m,v}$$

$$P_{u,v} = Z(P_{m+1,v} - P_{m,v}) + P_{m,v}$$

where $m = E/(u/E_L)$ and $z = D(u/E_L)$

The over-sampling that has just been described was based, both for columns and for lines, on only two elements of the line being processed. It is clear that this over-sampling may be based on the four or more elements that are closest together, applying the principle of weighting throughout. The image thus produced in a digital form by the disclosed method and system may either be directly used or transformed into analog forms, according to the nature of the screens used. The system is provided with an analog-logic converter (28) and with a logic-analog converter (29).

I claim:

1. A method for processing a source image in real time, the source image being furnished at a data rate C and being formed by a source matrix comprising Y0 columns and X0 lines of image elements, in order to produce a display image corresponding to said source image, or to a portion of said source image, the display image being displayed on a visualization display unit comprising N columns and M lines of visualization screens, said method comprising:

furnishing said source images at a data rate C, and assigning groups of adjacent data elements within the source matrix to respective image windows within an N by M matrix having M N image windows, each assigned group comprising one of M N image windows, each image window being divided into X1 lines and Y1 columns of image elements;

processing each image window, having X1 Y1 image elements, to produce a visualization screen matrix having Y4 columns and X4 lines of image elements, said processing comprising:

(a) sub-sampling the columns Y1 and lines X1 of each image window to produce an intermediate matrix of Y2 columns and X2 lines of image elements, Y2 being less than or equal to Y1 and X2 being less than or equal to X1, each image element of the intermediate image matrix being calculated as the arithmetic mean or the weighted mean of the corresponding image elements of the X1 Y1 image window;

(b) serially storing, at a rate C, the formed intermediate matrices in a temporary memory;

(c) reading image elements of the intermediate matrices from the temporary memory, in the same order as stored in said storing step, at a rate C' independent of the storing rate C;

(d) over-sampling columns Y2 and lines X2 of each intermediate matrix as data from the intermediate matrix is read from the temporary memory to produce an output matrix of Y3 columns and X3 lines of image elements, Y3 being greater than or equal to Y2 and X3 being greater than or equal to X2, each image element of the output matrix X3 Y3 being calculated as a weighted mean based upon the corresponding neighboring image elements of the intermediate matrix being over-sampled; and (e) registering each X3 Y3 image element output matrix into a matrix having Y4 columns and X4 lines of image elements, wherein Y3 is less than or equal to Y4, and X3 is less than or equal to X4.

2. The process of claim 1, wherein said sub-sampling step (a) comprises sub-sampling each Y1 X1 image window to produce an intermediate image matrix in accordance with a coefficient of sub-sampling for lines $K_L = X2/X1$, and a coefficient of sub-sampling for columns $K_C = Y2/Y1$, wherein $K_L$ and $K_C$ are defined by the ratio of $\frac{1}{2}^n$, wherein n is equal to an integer greater to or equal to 0.

3. The process of claim 1, wherein each image element of the output image X3 Y3 is calculated as a weighted mean of two corresponding elements of the closest two image elements of the intermediate matrix X2 Y2.

4. The process of claim 1, wherein in said step of sub-sampling, $K_C$ is equal to $K_L$, which is equal to 1;

said over-sampling step comprising over-sampling each intermediate matrix in accordance with a coefficient of over-sampling for lines of $E_L = X3/X2$ and in accordance with a coefficient of over-sampling for columns $E_C = Y3/Y2$, and further wherein $E_L = M$ and $E_C = N$.

5. The process of claim 4, wherein M=N.

6. A system for processing source images in real time, at a rate C, the processing comprising producing display images based upon all or a portion of said source images each represented by a source matrix of image elements, the source matrix having Y0 columns and X0 lines of image elements, each source matrix being converted to a display image to be displayed on a visualization display unit that displays an object matrix of visualization screens, the object matrix having N columns and M lines of visualization screens, said system comprising:

assigning means for assigning groups of adjacent data elements within said source matrix to respective image windows within an M by N matrix having M N image windows, each assigned group comprising one of the M N image windows, each image window being divided into X1 lines and Y1 columns of image elements; and processing means for processing each image window having X1 Y1 image elements, to produce a visualization screen matrix having Y4 columns and X4 lines of image elements to be visualized on one of the M N visualization screens, said processing means comprising:

(a) a sub-sampling unit, for receiving and sub-sampling, at a rate C, data representing the columns Y1 and lines X1 of each image window to produce an intermediate matrix of Y2 columns and X2 lines of image elements, said sub-sampling unit comprising a first sub-unit for sub-sampling the elements within each line of each image window, to thus form intermediate matrix lines each having Y2 elements, the coefficient for sub-sampling of the elements within each line being equal to $K_C = Y2/Y1$, said sub-sampling unit further comprising a second sub-unit for sub-sampling the intermediate matrix lines formed by the first sub-unit, in order to choose X2/X1 elements from each intermediate matrix line, in accordance with a coefficient of sub-sampling $K_L = X2/X1$;

(b) a transmission control unit comprising means for receiving the intermediate matrices of X2 Y2 image elements and means for forwarding the intermediate matrices to two temporary memories for receiving the intermediate matrices;

(c) said temporary memories, each comprising at least two segments, one segment being used for printing, and another segment being used for reading data therefrom, said temporary memories further comprising means for interchanging the roles of said one segment and said another segment at an end of printing each image matrix;

(d) a transmission commutator unit for enabling reading, at a rate C' independent of the rate C, each intermediate matrix image element from the temporary memories in the same order as the intermediate matrix data was originally placed into the temporary memories;

(e) an over-sampling unit for receiving, at a rate C', the intermediate matrices X2 Y2, one at a time from said transmission commutator unit, said over-sampling unit comprising a third sub-unit for over-sampling image elements of each line of an intermediate matrix to form over-sampled lines, in accordance with a coefficient of over-sampling of $E_C$=Y3/Y2, said over-sampling unit further comprising a fourth sub-unit for over-sampling the over-sampled lines formed by said third sub-unit in accordance with a coefficient of over-sampling of $E_L$=X3/X2;

said system further comprising a central processing unit for controlling said sub-sampling unit, said over-sampling unit, said transmission control unit, and said transmission commutator unit, and further comprising a control unit connected to said central processing unit, and comprising means for inputting several parameters comprising $K_C$, $K_L$, $E_C$ and $E_L$.

7. The system of claim 6, wherein the first and second sub-units of said sub-sampling unit are connected to one another serially.

8. The system of claim 7, wherein said first sub-unit comprises an adder for storing image elements and a divider, said adder comprising means for storing each image element corresponding to a particular line of an image window, each line comprising Y1 image elements, said adder further comprising means for adding each $K_C$ element and delivering the sum to said divider which divides the sum by $K_C$, thus forming intermediate matrix lines, each having Y2 elements.

9. The system of claim 7, wherein said second sub-unit comprises a multiplier and an adder, said multiplier comprising means for receiving lines from each image window, each comprising Y1 elements, and means for cyclically multiplying these elements one by one by the coefficients a(0), a(1), . . . a($K_C$−1), said multiplier thus operating according to the formula:

$$P_{i,n} = \sum_{j=n}^{j=n+K_C-1} P_{i,j} a(j-n),$$

where $P_{i,n}$ is a calculated line element, $P_{i,j}$ is an element of a line window, and a=a(0), a(1) . . . a($K_C$−1) are weighting coefficients.

10. System of claim 7, wherein said second sub-unit comprises an adder for storing lines, a line memory and a divider, the adder comprising means for receiving the intermediate matrix lines exiting from said first sub-unit and means for adding each of the $K_L$ lines together and storing, as required, the intermediate results in the line memory up until the $K_L$th line, the divider dividing each element of the accumulated stored $K_L$ lines in the memory regrouping $K_L$, thus producing intermediate matrices of image elements, each matrix comprising Y2 columns and X2 lines of image elements.

11. System of claim 7, wherein said second sub-unit for sub-sampling of lines comprises a multiplier, an adder for storing lines, and a line memory, the multiplier comprising means for receiving the intermediate matrix lines from the said first sub-unit and means for cyclically multiplying the elements of each line by coefficients a'(0), a'(1), . . . a'($K_L$−1), the adder comprising means for adding each of $K_L$ elements and storing, bit by bit, the intermediate results in the line memory, thus producing intermediate images of X2 lines and Y2 columns.

12. System of claim 6, wherein said third and fourth sub-units are connected to one another serially.

13. System as defined by claim 12, wherein said third sub-unit comprises a subtractor, a multiplier and an adder, the subtractor comprising means for receiving the intermediate matrix of X2 Y2 image elements and determining the difference between the two successive elements $P_{m,n}$ and $P_{mn}$+1, wherein n corresponds to a portion v/$E_C$, v being the number of columns of the image element being calculated and $E_C$ being the coefficient of over-sampling of the columns, the multiplier comprising means for multiplying the difference by the decimal portion (W) of said ratio, the adder comprising means for adding the result of the multiplication to the value of the element $P_{m,n}$ thus producing an element $P_{m,v}$ according to which:

$$P_{m,v} = E(P_{m,n+1} - P_{m,n}) + P_{m,n}$$

where n=E (v/$E_C$) and w=D (v/$E_C$).

14. System of claim 12, wherein said fourth sub-unit comprises a line memory, a subtractor, a multiplier and an adder, the line memory storing Y3 image elements including elements $P_{m,v}$ where m is the whole portion of the ratio u/$E_L$, u being the number of lines of the image element being calculated and $E_L$ being the coefficient of over-sampling of lines, the subtractor comprising means for reading two successive elements $P_{m,v}$ and $P_{m+1,v}$ and retaining the difference between them, the multiplier comprising means for multiplying the difference by the decimal portion (Z) of said ratio, the adder comprising means for adding the result of this multiplication to the value of the element $P_{m,v}$ according to which:

$$P_{u,v} = Z(P_{m+1,v} - P_{m,v}) + P_{m,v}$$

where m=E(u/$E_L$) and

Z=D(u/$E_L$).

15. A method for processing source images in real time, the processing involving enlarging a source image represented by a source matrix of image elements, the source matrix having Y0 columns and X0 lines of image elements, the source matrix being converted to an enlarged image to be displayed on a display unit that displays an object matrix of visualization screens, the object matrix having N columns and M lines of visualization screens, said method comprising:

assigning groups of adjacent data elements within the source matrix to respective image windows within an M by N matrix having M N image windows, each assigned group comprising one of the M N image windows, each image window being divided into X1 lines and Y1 columns of image elements;

processing each image window, having X1 Y1 image elements, to produce a visualization screen matrix having Y4 columns and X4 lines of image elements, said processing comprising:

(a) sub-sampling the columns Y1 and lines X1 of each image window to produce an intermediate matrix of Y2 columns and X2 lines of image elements, Y2 being less than Y1 and X2 being less than x1;

(b) storing the formed intermediate matrices in a temporary memory;

(c) reading image elements from the temporary memory;

(d) oversampling the columns Y2 and lines X2 of each intermediate matrix as data from the intermediate matrix is read from the temporary memory to produce an output matrix of Y3 columns and X3 lines of image elements, Y3 being greater than Y2 and X3 being greater than X2; and (e) registering each Y3 X3 image element output matrix to a matrix having Y4 columns and X4 lines of image elements, wherein Y3 is less than or equal to Y4, and X3 is less than or equal to X4.

* * * * *